United States Patent
Oyama

(10) Patent No.: US 11,463,626 B2
(45) Date of Patent: Oct. 4, 2022

(54) PAN/TILT HEAD AND IMAGE PICKUP APPARATUS

(71) Applicant: CANON KABUSHIKI KAISHA, Tokyo (JP)

(72) Inventor: Yuki Oyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/517,731

(22) Filed: Nov. 3, 2021

(65) Prior Publication Data
US 2022/0150415 A1  May 12, 2022

(30) Foreign Application Priority Data
Nov. 12, 2020  (JP) .............................. JP2020-188714

(51) Int. Cl.
*H04N 5/232* (2006.01)
*G03B 17/12* (2021.01)

(52) U.S. Cl.
CPC ......... *H04N 5/23299* (2018.08); *G03B 17/12* (2013.01); *H04N 5/23258* (2013.01)

(58) Field of Classification Search
CPC .... F16M 11/10; F16M 11/08; F16M 11/2014; F16M 11/043; F16M 11/18; F16M 11/041; H04N 5/2251; H04N 5/23299; H04N 5/23258; G03B 17/12; G03B 17/00; F16C 2300/14; F16C 2322/39; F16C 19/181; F16C 33/581; F16B 2/185
USPC ........................................................ 348/373
See application file for complete search history.

(56) References Cited

U.S. PATENT DOCUMENTS

| | | | | |
|---|---|---|---|---|
| 5,056,745 A | * | 10/1991 | Gelbard | F16M 11/2035 248/278.1 |
| 6,124,892 A | * | 9/2000 | Nakano | G08B 13/19632 348/373 |
| 6,493,414 B1 | * | 12/2002 | Callahan | G11C 17/18 714/724 |
| 7,690,851 B2 | * | 4/2010 | Yamane | H04N 5/2251 348/374 |
| 7,929,049 B2 | * | 4/2011 | Yamane | G08B 13/19619 348/373 |
| 9,182,070 B2 | * | 11/2015 | Shannahan | F16M 11/2014 |
| 10,536,616 B2 | * | 1/2020 | Fukuzawa | H02N 2/001 |
| 2001/0055487 A1 | * | 12/2001 | Akada | H04N 5/2251 396/427 |

(Continued)

FOREIGN PATENT DOCUMENTS

JP   2013-101397 A   5/2013

*Primary Examiner* — Pritham D Prabhakher
(74) *Attorney, Agent, or Firm* — Cowan, Liebowitz & Latman, P.C.

(57) ABSTRACT

In order to provide a pan/tilt head and an image pickup apparatus that enables highly accurate rotation detection without increasing the size, a pan/tilt head on which a camera unit can be mounted comprises: a drive unit for rotating the camera unit in a predetermined direction; a first deceleration mechanism configured to engage the drive unit via a drive transmission unit; a second deceleration mechanism configured to engage the first deceleration mechanism and rotate the camera unit in the predetermined direction; and a rotation angle detector configured to be disposed on the first deceleration mechanism and detect a rotation angle of the first deceleration mechanism.

9 Claims, 10 Drawing Sheets

(56) References Cited

U.S. PATENT DOCUMENTS

| | | | | |
|---|---|---|---|---|
| 2005/0258691 A1* | 11/2005 | Furuki | .................. | H02K 23/66 |
| | | | | 310/239 |
| 2006/0056594 A1* | 3/2006 | Sonobe | .................... | A61B 6/14 |
| | | | | 378/117 |
| 2008/0012980 A1* | 1/2008 | Yamane | ........... | G08B 13/19619 |
| | | | | 348/E5.025 |
| 2008/0013944 A1* | 1/2008 | Yamane | ................ | F16M 11/10 |
| | | | | 348/E5.025 |
| 2015/0192241 A1* | 7/2015 | Shannahan | ............... | F16H 7/14 |
| | | | | 248/178.1 |
| 2016/0025258 A1* | 1/2016 | Shannahan | ........ | F16M 11/2014 |
| | | | | 29/428 |
| 2016/0077481 A1* | 3/2016 | Katano | .............. | G03G 15/6576 |
| | | | | 399/406 |
| 2018/0367738 A1* | 12/2018 | Fukuzawa | .......... | H04N 5/23299 |
| 2020/0344385 A1* | 10/2020 | Ujiie | ................ | G08B 13/19619 |
| 2021/0289124 A1* | 9/2021 | Kim | ....................... | G02B 7/102 |

* cited by examiner

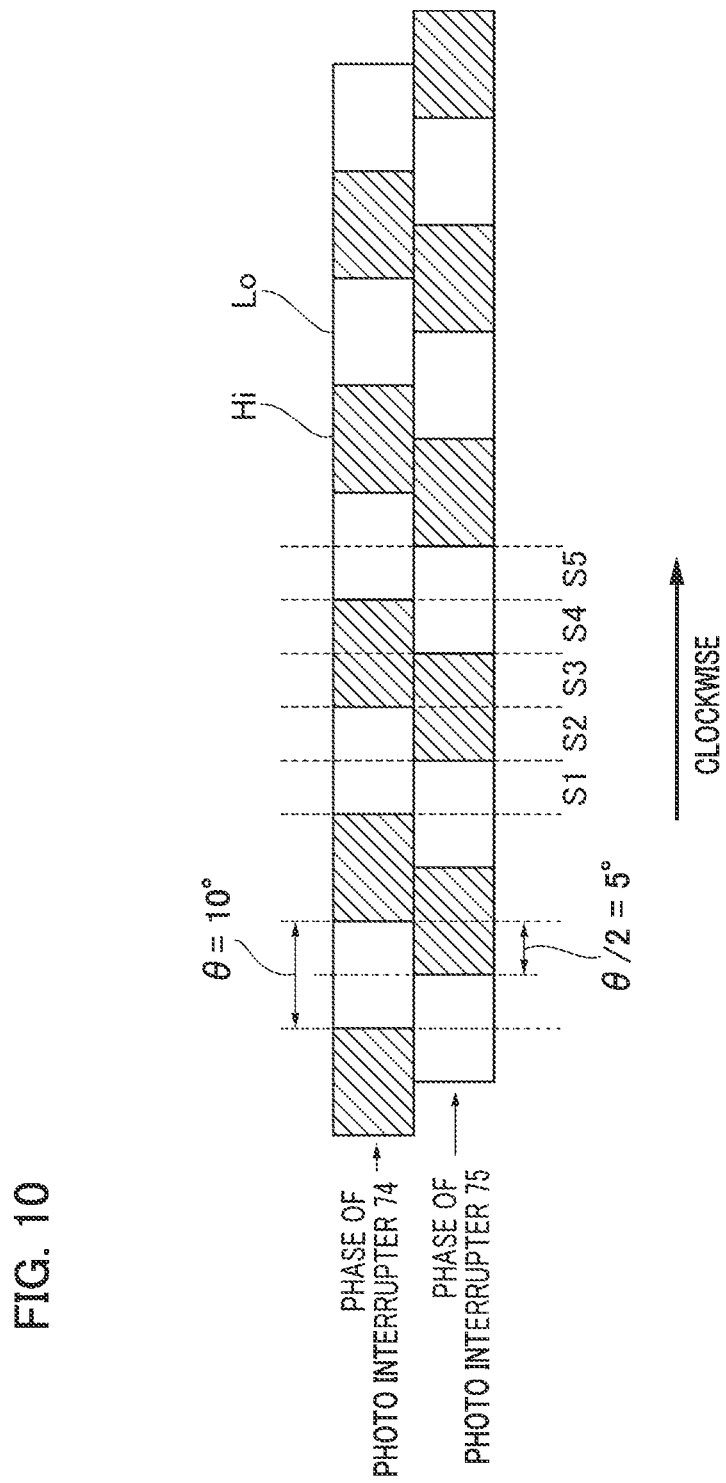

PAN/TILT HEAD AND IMAGE PICKUP APPARATUS

BACKGROUND OF THE INVENTION

Field of the Invention

The present invention relates to a pan/tilt head and an image pickup apparatus for rotating a camera unit in a predetermined direction.

Description of the Related Art

Examples of a lens barrel rotation type image pickup apparatus in which a lens barrel rotates include a video camera for video conferences and a monitoring camera. These cameras can be rotated horizontally (hereinafter, referred to as a "panning direction") and vertically (hereinafter, referred to as a "tilting direction") to view the surroundings. The lens barrel can be rotated in the panning direction and the tilting direction toward an object such that the object at the center of the angle of view is captured, and the rotation status of the lens barrel (whether the lens barrel is rotated or not, and the current position of the rotation) can be detected.

In Japanese Patent Laid-Open No. 2013-101397, a tilting drive mechanism that rotates the camera unit in the tilting direction is disposed in one support that supports the camera unit, and a large encoder mechanism is disposed in the other support that supports the camera unit, so that a rotation state of the camera unit with high accuracy is detected.

However, in the technique disclosed in Japanese Patent Laid-Open No. 2013-101397, the tilting rotation mechanism that rotates the camera unit in the tilting direction is disposed in the support that supports the camera unit, and the encoder mechanism is disposed in the other support. Accordingly, a space for disposing the encoder is required, which may increase the size of the entire apparatus.

SUMMARY OF THE INVENTION

An object of the present invention is to improve the above drawback and provide a pan/tilt head, an image pickup apparatus, and the like capable of performing highly accurate rotation detection without increasing their size.

In order to achieve the above object, a pan/tilt head of one aspect of the invention comprises: a drive unit configured to rotate a camera unit in a predetermined direction;
a first deceleration mechanism configured to engage the drive unit via a drive transmission unit; a second deceleration mechanism configured to engage the first deceleration mechanism and rotate the camera unit in the predetermined direction; and
a rotation angle detector configured to be disposed on the first deceleration mechanism and detect a rotation angle of the first deceleration mechanism.

Further features of the present invention will become apparent from the following description of embodiments with reference to the attached drawings.

BRIEF DESCRIPTION OF THE DRAWINGS

FIG. 10 is an explanatory view illustrating a light receiving state and a light shielding state of the photo interrupter when the panning rotation detection ring of the image pickup apparatus in the embodiment of the present invention rotates clockwise.

DESCRIPTION OF THE EMBODIMENTS

Hereinafter, with reference to the accompanying drawings, the favorable mode of the present invention will be described using embodiments. In each diagram, the same reference signs are applied to the same members or elements, and duplicate descriptions will be omitted or simplified. In the embodiment, an example in which a network camera used for live streaming and the like serving as an image pickup apparatus is combined with a pan/tilt head will be described. However, the examples of the image pickup apparatus include electronic devices having an image pickup function such as a digital still camera, a digital movie camera, a smartphone with a camera, a tablet computer with a camera, and an in-vehicle camera.

Figure 1:
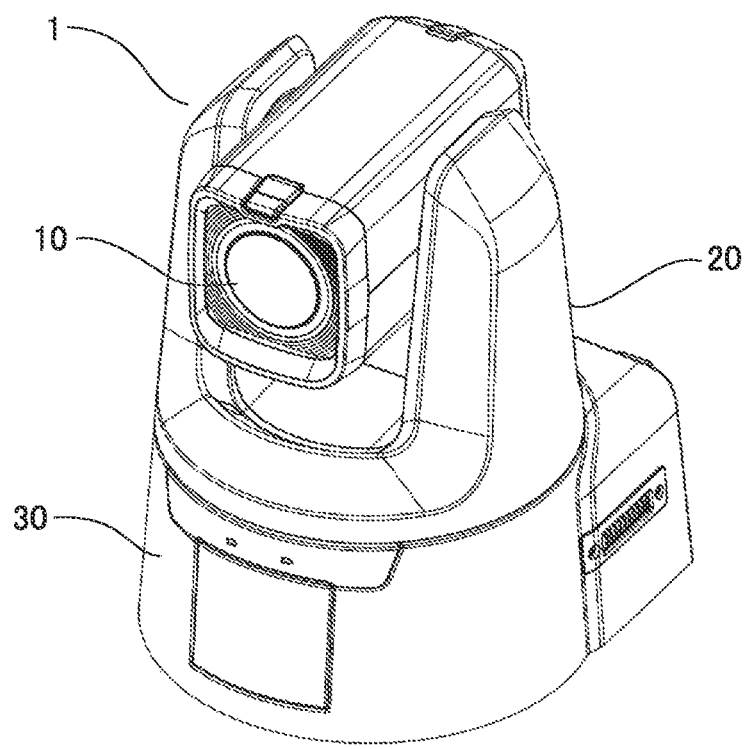
FIG. 1 is a front perspective view of an image pickup apparatus in the embodiment of the present invention.

An image pickup apparatus and a rotation detection mechanism in the embodiment of the present invention will be described below with reference to FIGS. 1 to 10. FIG. 1 is a front perspective view of the image pickup apparatus in the embodiment of the present invention. A video camera (network camera) 1 serving as the image pickup apparatus is mounted by installing the underside (installation surface) of a base unit 30 on a table or ceiling and is used for live streaming and the like via the Internet.

The base unit 30 rotatably supports a rotation unit 20 in the horizontal direction (panning direction). The rotation unit 20 rotatably supports the lens unit 10 in the vertical direction (tilting direction). The base unit 30 and the rotation unit 20 configure a pan/tilt head for rotating the camera unit in the panning and tilting directions. The camera unit may be configured to be easily detachable from the pan/tilt head.

A lens barrel 11 for image pickup and other components are attached to the lens unit 10. In the present embodiment, a rotation axis in the horizontal direction (panning direction) is set to be perpendicular to the bottom surface (installation surface) of the base unit 30. However, it may be possible to set the rotation axis in the horizontal direction (panning direction) not to be perpendicular to the underside (installation surface) of the base unit 30.

Additionally, the rotation in the horizontal direction (panning direction) and the vertical direction (tilting direction) means that when the installation surface of the video camera 1 is mounted on a substantially horizontal surface of, for example, a tabletop and ceiling, the video camera 1 is set to rotate in a substantially horizontal direction and a substantially vertical direction. The rotation in the horizontal direction (panning direction) and in the vertical direction (tilting direction) when the installation surface of the video camera 1 is mounted on a surface tilted at a predetermined angle with respect to the horizontal are the rotation respectively tilted by the predetermined angle with respect to the horizontal or vertical.

The rotation unit 20 rotates in the horizontal direction (panning direction) around the vertical axis in FIG. 1. The lens unit 10 rotates in the vertical direction (tilting direction) around the horizontal axis shown in FIG. 1. At this time, the vertical axis and horizontal axis are set to intersect with the optical axis of the lens barrel 11. Hence, the optical axis of the lens barrel 11 always passes through the vertical axis and horizontal axis even if the lens unit 10 rotates accompanying the rotation of the rotation unit 20.

Figure 2:
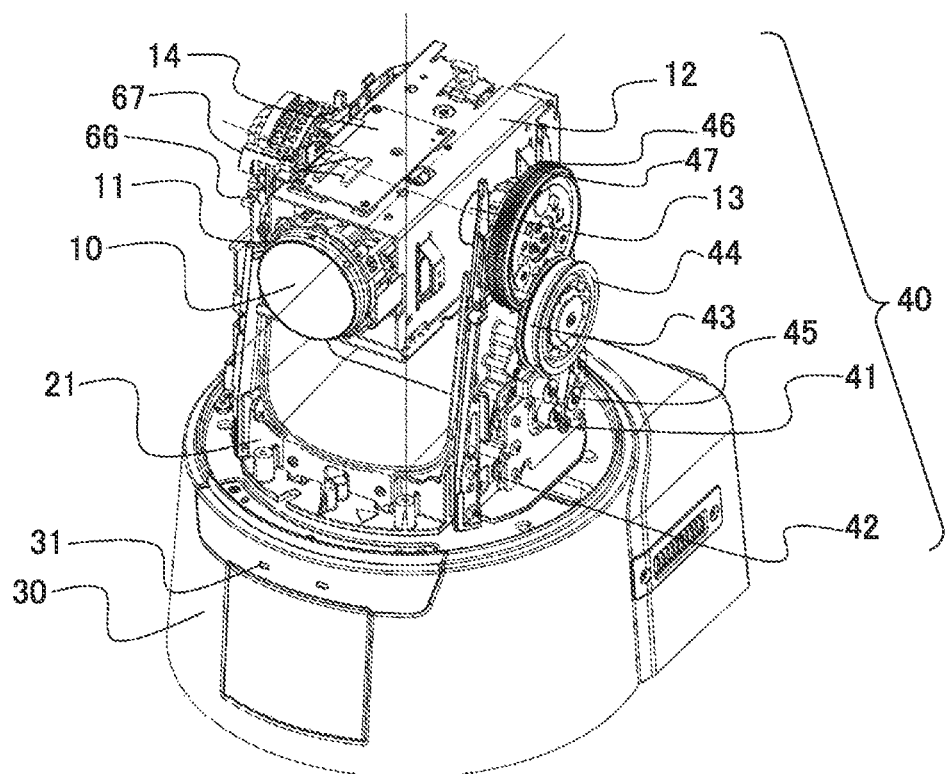
FIG. 2 is a partially perspective view illustrating an internal structure of the image pickup apparatus in the embodiment of the present invention.

Next, a rotation drive mechanism of the lens unit 10 of the video camera 1 in the present embodiment will be described with reference to FIG. 2. The rotation drive mechanism functions as a rotation drive unit for rotating the camera unit in a predetermined direction. In the present embodiment, although a configuration in which both rotation in the panning direction and rotation in the tilting direction can be performed will be described, a configuration in which rotation in only one direction can be performed may be used. FIG. 2 is a partially perspective view of the internal structure of the image pickup apparatus in the present embodiment. Components that are unnecessary for explanation and make the drawing complicated will be omitted.

As shown in FIG. 2, the lens unit 10 is supported by a lens chassis 12 such that the optical axis of the lens barrel 11 intersects the horizontal axis (the rotation center axis of in the tilting direction) and the lens chassis 12 is provided with a rotation shaft 13 for rotating in the tilt direction. The rotation shaft 13 is rotatably supported by a tilt chassis 21 provided in the rotation unit 20 to be aligned with the horizontal axis, which is the rotation center axis in the tilting direction.

Hence, the lens barrel 11, which is supported by the tilt chassis 21 via the rotation shaft 13 of the lens chassis 12, rotates in the tilting direction with respect to the tilt chassis 21, integrally with the lens chassis 12.

The tilt chassis 21 is rotatably supported with respect to the base unit 30 around the vertical axis, which is the rotation central axis in the panning direction. Hence, the lens barrel 11 rotates in the panning direction with respect to the base unit 30, integrally with the lens chassis 12 and the tilt chassis 21, while the optical axis of the lens barrel 11 intersects the vertical axis (the rotation center axis in the panning direction).

Thus, the lens barrel 11 is rotatable in the tilting direction with respect to the base unit 30 shown in FIG. 1, around the horizontal axis, integrally with the lens chassis 12. Additionally, the lens barrel 11 is rotatable in the panning direction with respect to the base unit 30 shown in FIG. 1, around the vertical axis, integrally with the lens chassis 12 and the tilt chassis 21.

An imaging element (not illustrated) is attached to the back of the lens barrel 11. The examples of the imaging element include a CMOS (Complementary Metal Oxide Semiconductor) device and CCD (Charge Coupled Devices). When the lens barrel 11 is rotated in the tilting direction and the panning direction, light incident on the lens barrel 11 along the optical axis direction is imaged on the imaging surface of the imaging element. An optical image is then converted into a charge distribution, stored, and read out as an electrical signal. Thus, an object in a direction in which the lens barrel 11 faces can be imaged and output.

A tilt rotation drive mechanism 40 will now be described. The tilt rotation drive mechanism 40 includes a tilt motor 41 serving as a drive source (a drive unit), an image stabilization damper 42, a timing belt 43 serving as a drive transmission means that engages the tilt motor 41, a toothed pulley 44, a tension pulley 45, a first tilt gear 46, and a second tilt gear 47. All the components of the tilt rotation drive mechanism 40 are arranged on the left side surface of the tilt chassis 21 (right front side in FIG. 2), in which the tilt motor 41 is attached to the tilt chassis 21 via the image stabilization damper 42.

A rotation driving force generated by the tilt motor 41 is transmitted to the toothed pulley 44 via the timing belt 43. At this time, the tension of the timing belt 43 is adjusted by the tension pulley 45. A gear 68 (refer to FIG. 4) provided on the rotation shaft of the toothed pulley 44 engages the first tilt gear 46 and the second tilt gear 47, and the first tilt gear 46 is coupled to the rotation shaft 13 of the lens chassis 12.

The engaging portions of the gear 68 of the toothed pulley 44, the first tilt gear 46, and the second tilt gear 47 have a helical gear shape, and the first tilt gear 46 functions as a first helical gear and the second tilt gear 47 function as a second helical gear.

The first tilt gear 46 and the second tilt gear 47 respectively engage the gear 68 of the toothed pulley 44 and are arranged in parallel. The second tilt gear 47 is movably disposed along the rotation shaft 13 and is biased in a direction of the first tilt gear 46 by a spring (not illustrated). That is, a biasing means (for example, a spring) for relatively biasing the first helical gear and second helical gear is provided. Hence, the gear 68 of the toothed pulley 44, and the first tilt gear 46 and the second tilt gear 47 can always be engaged with each other and transmit drive without generating backlash regardless of which direction they are rotated.

Therefore, when the tilt motor 41 of the tilt rotation drive mechanism 40 is driven, the drive force is transmitted to the toothed pulley 44 by the timing belt 43. A rotation speed decelerates from the tilt motor 41 to the toothed pulley 44 (first stage), and further decelerates from the toothed pulley 44 to the first tilt gear 46 and the second tilt gear 47 (second stage). The timing belt 43 and the toothed pulley 44 configure a first deceleration mechanism, and the gear 68 of the toothed pulley 44, and the first tilt gear 46 and the second tilt gear 47 configure a second deceleration mechanism.

Accordingly, it possible to rotate the lens chassis 12 and lens barrel 11 around the rotation shaft 13 at a fine rotation angle in the tilting direction. Additionally, the driving force of the tilting motor 41 is transmitted after the speed is decelerated by two stages, and even if the lens barrel 11 is configured to be large and heavy to be compatible with high image quality, for example, 4K image quality, the rotation drive can be smoothly performed in the tilt direction. Additionally, the occurrence of vibration and noise caused by driving can be reduced by the image stabilization damper 42 and the timing belt 43.

Additionally, reference numeral 66 is a photo interrupter and reference numeral 67 is a light shielding portion that moves integrally with the lens chassis 12, and the photo interrupter and light shielding portion are configured to detect the horizontal reference position that becomes a reference for rotation of the lens barrel 11 in the tilting direction. In the present embodiment, the rotation position where the lens barrel 11 is parallel to the underside (installation surface) of the base unit 30 is set as the horizontal reference position.

Figure 3:
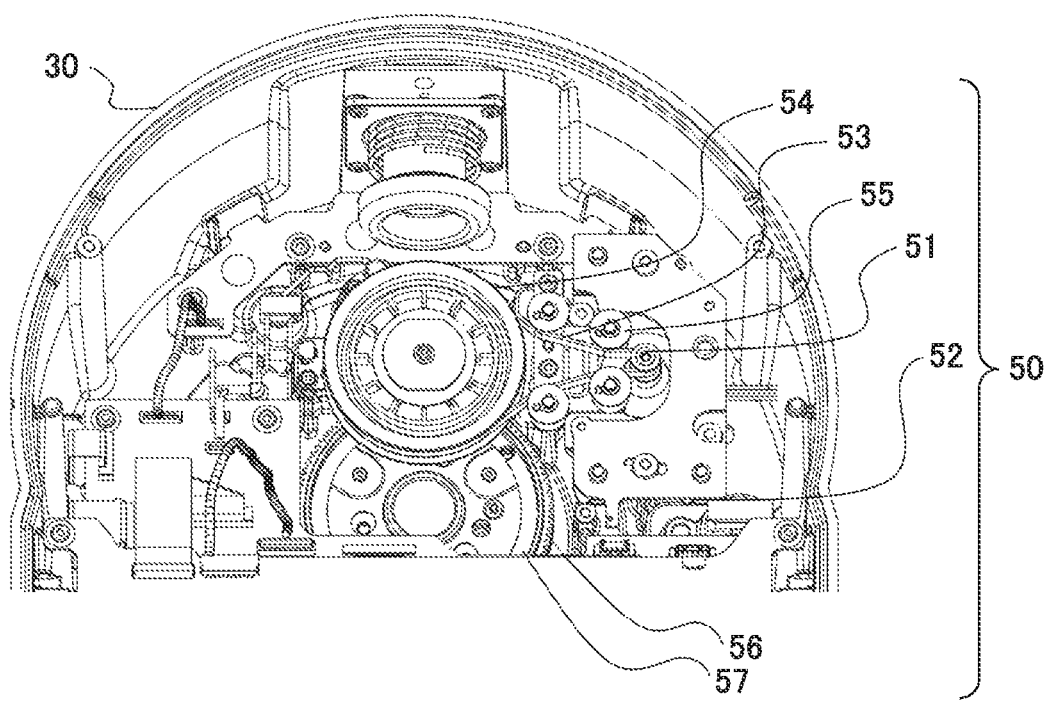
FIG. 3 is a bottom view of the internal structure of the image pickup apparatus in the embodiment of the present invention.

Next, a panning rotation drive mechanism 50 will be described. FIG. 3 is a bottom view illustrating the internal structure of the image pickup apparatus in the present embodiment. The panning rotation drive mechanism 50 includes a panning motor 51 serving as a drive source (a drive unit), an image stabilization damper 52, a timing belt 53 serving as a drive transmission means that engages the panning motor 51, a toothed pulley 54, a tension pulley 55, a first panning gear 56, and a second panning gear 57.

The panning rotation drive mechanism 50 is disposed inside the base unit 30, and the panning motor 51 is attached to the base unit 30 via the image stabilization damper 52, and a rotation driving force generated by the panning motor 51 is transmitted to the toothed pulley 54 via the timing belt 53. At this time, the tension of the timing belt 53 is adjusted by the tension pulley 55.

A gear 76 (refer to FIG. 8) provided on the rotation shaft of the toothed pulley 54 engages the first panning gear 56 and the second panning gear 57, and the first panning gear 56 is coupled to the vertical shaft of the tilt chassis 21. Here, engaging portions of the gear 76 of the toothed pulley 54, and the first panning gear 56 and the second panning gear 57 have a helical gear shape, and the first panning gear 56 functions as a first helical gear and the second panning gear 57 functions as a second helical gear.

The first panning gear 56 and the second panning gear 57 respectively engage the gear 76 of the toothed pulley 54 and arranged in parallel. The second panning gear 57 is movably disposed along the vertical axis of the tilt chassis 21 and is biased by a spring (not illustrated) in the direction of the first panning gear 56.

Thus, a biasing means for relatively biasing the first helical gear and second helical gear is provided. Hence, the gear 76 of the toothed pulley 54 and the first panning gear 56 and the second panning gear 57 can always be engaged with each other and transmit driving without generating backlash regardless of which direction they are rotated.

Accordingly, when the panning motor 51 of the panning rotation drive mechanism 50 is driven, the drive force is transmitted to the toothed pulley 54 by the timing belt 53. The rotation speed is decelerated from the panning motor 51 to the toothed pulley 54 (first stage) and further decelerated from the toothed pulley 54 to the first panning gear 56 and the second panning gear 57 (second stage).

The timing belt 53 and the toothed pulley 54 configure the first deceleration mechanism, and the gear 76 of the toothed pulley 54, and the first panning gear 56 and the second panning gear 57 configure the second deceleration mechanism that engages the first deceleration mechanism. Thereby, it is possible to rotate the tilt chassis 21 and the lens barrel 11 around the vertical axis at a fine rotation angle in the panning direction.

Additionally, the driving force of the panning motor 51 is transmitted after the speed is decelerated by two stages, and even if the lens barrel 11 is configured to be large and heavy so as to be compatible with high image quality, for example, 4K image quality, the rotation driving can be smoothly performed in the panning direction. Additionally, the occurrence of vibration and noise due to driving can be reduced by the image stabilization damper 52 and the timing belt 53.

Thus, in the video camera 1 of the present embodiment, the lens barrel 11 rotates in the tilting direction by the tilting rotation drive mechanism 40 and rotates in the panning direction by the panning rotation drive mechanism 50.

Figure 4:
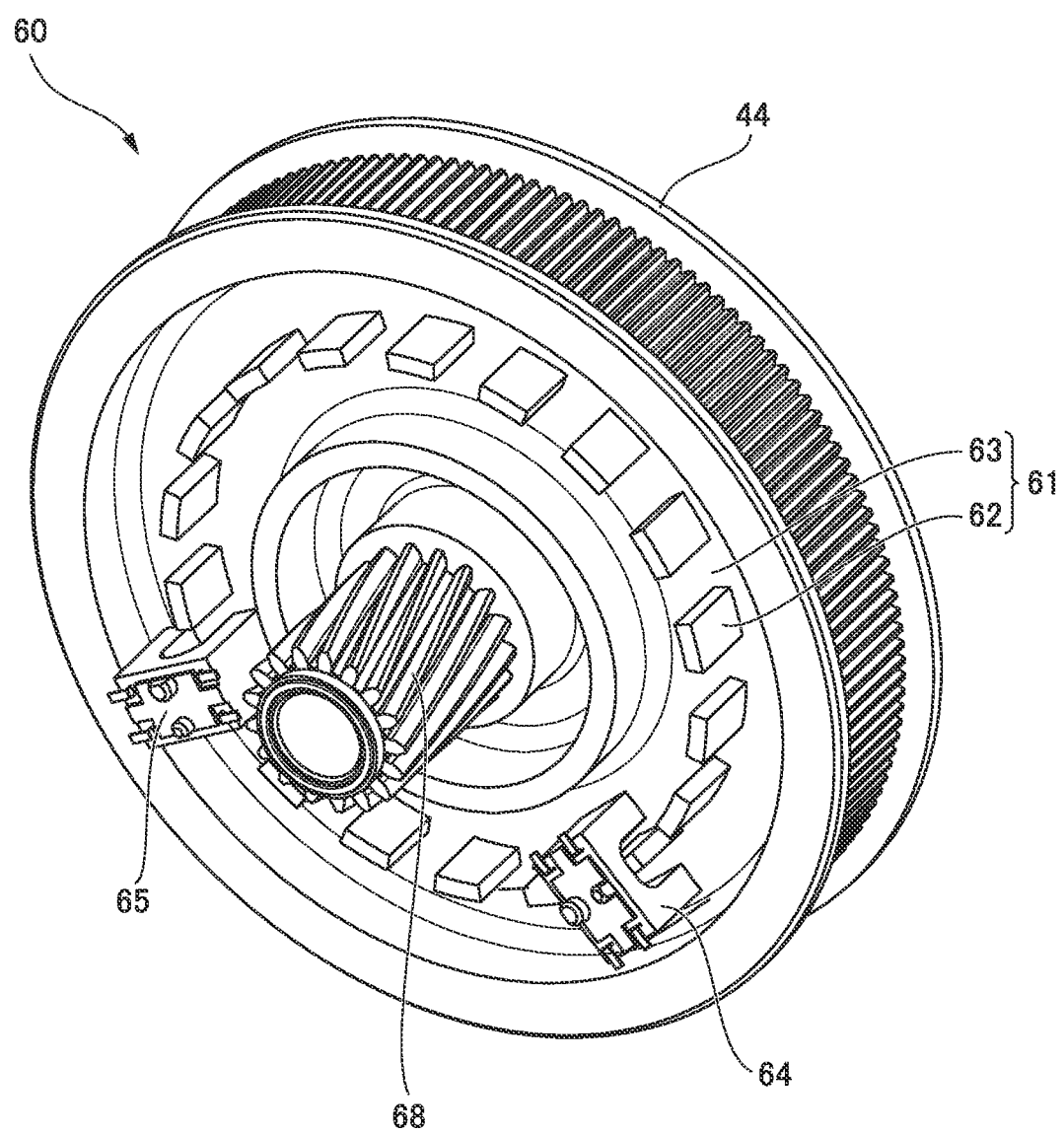
FIG. 4 illustrates a tilting rotation detection unit of the image pickup apparatus in the embodiment of the present invention.

Next, a tilting rotation detection unit 60 will be described. A panning rotation detection unit 70 will be described below. The tilting rotation detection unit 60 and the panning rotation detection unit 70 function as a rotation angle detection means that detects a rotation angle of the first deceleration mechanism. FIG. 4 is a perspective view of the tilting rotation detection unit of the image pickup apparatus in the present embodiment. As shown in FIG. 4, the tilting rotation detection unit 60 is provided with two photo interrupters 64 and 65.

The tilting rotation detection unit 60 is also provided with a plurality of light-shielding portions 62 that are arranged at every predetermined angle around the rotation center of the toothed pulley 44 serving as the first deceleration mechanism and can shield light emitted by a light emitting part of the photo interrupter. The tilting rotation detection unit 60 also has a light transmitting portion (slit) 63 between the plurality of light shielding portions 62, and the light shielding portions 62 and the light transmitting portion 63 configure a rotation detection ring 61. The photo interrupters 64 and 65 each have a light emitting part and a light receiving part that faces away from the light emitting part and are configured so that the light shielding portion 62 and the light transmitting portion 63 pass between the light emitting part and the light receiving part accompanying the rotation of the toothed pulley 44.

The rotation detection ring 61 rotates integrally with the toothed pulley 44. Hence, when the driving force is transmitted to the toothed pulley 44 via the timing belt 43 by the rotation drive of the tilt motor 41, the rotation detection ring 61 rotates. The light shielding portions 62 and the light transmitting portions 63 formed on the rotation detection ring 61 are alternately arranged at a certain width to form a comb tooth shape. Therefore, when the rotation detection ring 61 rotates, an operation in which light emission from the photo interrupters 64 and 65 are shielded by the light shielding portion 62 and transmitted by the light transmitting portion 63 are alternately repeated.

The photo interrupters 64 and 65 are disposed separately with a predetermined rotation phase difference on the tilt chassis 21 so that the number of rotations and angle of rotation of the rotation detection ring 61 can be detected. The toothed pulley 44 is a cylindrical part, and the photo interrupters 64 and 65 are disposed inside the cylindrical part of the toothed pulley 44. As described above, the reference position of the rotation position of the lens barrel 11 in the tilt direction (for example, horizontal reference position) is detected by the photo interrupter 66 disposed on the tilt chassis 21 and a light shielding portion 67 that is movable integrally with the lens chassis 12, as shown in FIG. 2.

Figure 5:
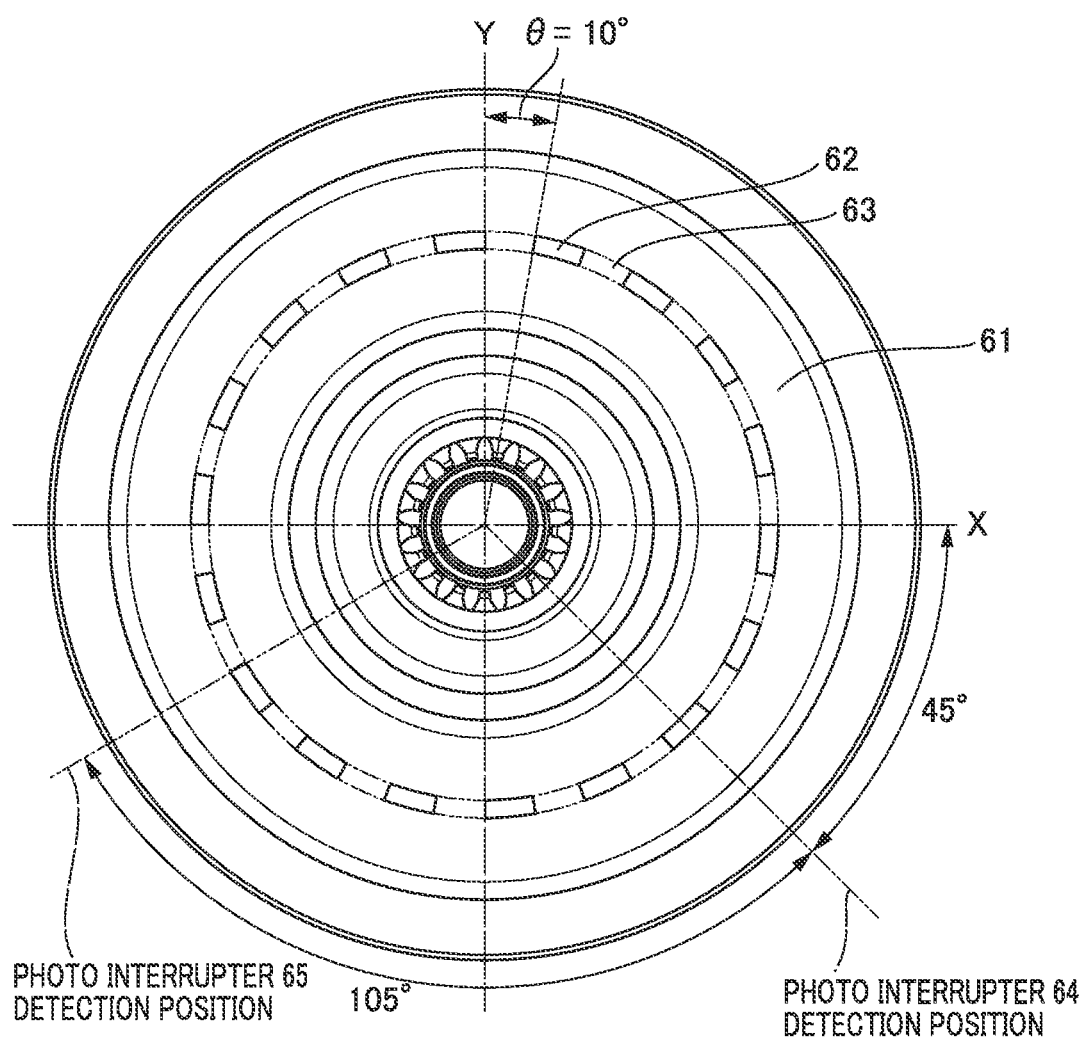
FIG. 5 illustrates a relation between a photo interrupter and a tilting rotation detection ring of the image pickup apparatus in the embodiment of the present invention.

FIG. 5 illustrates the relation between the photo interrupter and the tilting rotation detection ring of the image pickup apparatus in the present embodiment. The X-axis and Y-axis in FIG. 5 are shown for convenience of explanation. The X-axis matches the optical axis and the positive direction of the X-axis is the front direction of the lens barrel 11. The width of the light shielding portion 62 and the width of the angle of the light transmitting portion 63 are each θ. The arrangement of the photo interrupters 64 and 65 is an example and the present invention is not limited thereto.

Here, the width θ of each of the light shielding portion 62 and the light transmitting portion 63 is determined by the resolution necessary for detecting the rotation direction (tilting direction) of the rotation detection ring 61 and whether or not the photo interrupter can sufficiently detect a light shielding state and a light transmitting state. In the video camera 1 of the present embodiment, the width θ is 10°.

The photo interrupter 64 is disposed at a position rotated by 45° from the X-axis and the photo interrupter 65 is disposed at a position further rotated by 105° (=10θ+θ/2) from the position where the photo interrupter 64 is disposed. The rotation phase difference, which is the separation interval between the photo interrupter 64 and the photo interrupter 65, may be (nθ+θ/2)°, where "n" is an integer.

When the rotation detection ring 61 rotates clockwise or counterclockwise, the rotation state of the rotation detection ring 61 can be detected based on the width θ of the light shielding portion 62 and the light transmitting portion 63 of the rotation detection ring 61 and the disposition of the photo interrupters 64 and 65 described above. That is, the presence or absence of rotation and the rotation angle can be detected by a repeat of the light receiving state and light shielding state of the photo interrupters 64 and 65.

Figure 6:
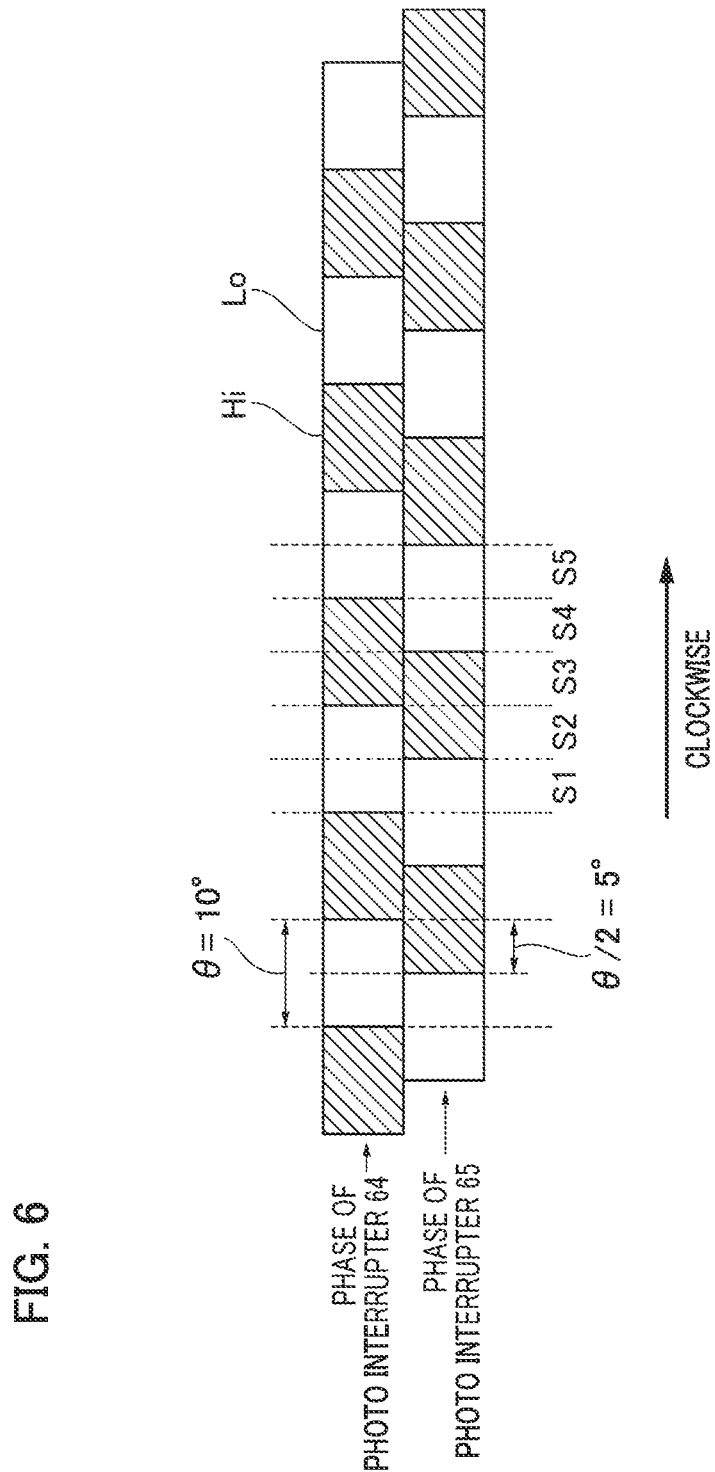
FIG. 6 illustrates a light receiving state and a light shielding state of the photo interrupter when the tilting rotation detecting ring of the image pickup apparatus in the embodiment of the present invention rotates clockwise.

FIG. 6 illustrates a light receiving state and a light shielding state of each of the photo interrupters 64 and 65 when the rotation detection ring 61 of the tilting rotation detection unit 60 rotates clockwise. For the sake of convenience, hereinafter, a state in which light emitted by the light emitting part of the photo interrupters 64 and 65 is transmitted through the light transmitting portion 63 and the light receiving part is in a light receiving state is denoted by "Lo" (Low) and a state in which light emitted by the light emitting part is shielded by the light shielding portion 62 and the light receiving part is in a light shielding state is denoted by "Hi" (High).

Step S1 shown in FIG. 6 indicates a state in which the photo interrupter 64 is in a light transmitting state and the photo interrupter 65 is in a light transmitting state. Accordingly, the outputs of the photo interrupters 64 and 65 are (Lo, Lo).

Next, when the light shielding portion 62 and the light transmitting portion 63 move by the clockwise rotation of the rotation detection ring 61, the state transitions to step S2 in which the photo interrupter 64 is in the light transmitting state and the photo interrupter 65 is in a light shielding state. Accordingly, the outputs of the photo interrupters 64 and 65 are (Lo, Hi).

When the light shielding portion 62 and the light transmitting portion 63 further move by the clockwise rotation of the rotation detection ring 61, the state transitions to step S3 in which the photo interrupter 64 is in the light shielding state and photo interrupter 65 is in the light shielding state. Therefore, the outputs of the photo interrupters 64 and 65 are (Hi, Hi).

Subsequently, when the light shielding portion 62 and the light transmitting portion 63 move by the clockwise rotation of the rotation detection ring 61, the state transitions to step S4 in which the photo interrupter 64 is in the light shielding state and photo interrupter 65 is in the light transmitting state. Accordingly, the outputs of the photo interrupters 64 and 65 are (Hi, Lo). Then, when the light shielding portion 62 and the light transmitting portion 63 moves by the clockwise rotation of the rotation detection ring 61, the state transitions to step S5 in which the photo interrupter 64 is in the light transmitting state and photo interrupter 65 is in the light transmitting state, which is the state same as step S1.

As described above, when the rotation detection ring 61 rotates clockwise, the outputs of the photo interrupters 64 and 65 change from (Lo, Lo) of step S1 to (Lo, Hi), (Hi, Hi), and (Hi, Lo). Then, in step S5, the outputs return to (Lo, Lo) that is the same as step S1, and the outputs of the same change pattern are repeated thereafter.

At this time, as shown in FIG. 5, since the photo interrupter 64 and photo interrupter 65 differ in angle by 105° (=10θ+θ/2), the step shifts every 5° (=θ/2) from step S1 to step S5. That is, a change in rotation of the toothed pulley 44 on which the rotation detection ring 61 is mounted can be detected every 5°.

At this time, in the tilting rotation drive mechanism 40 of the video camera 1 of the present embodiment, a deceleration ratio from the toothed pulley 44 to the first tilt gear 46 and the second tilt gear 47 is seven times. Hence, it is possible to detect the rotation of the lens barrel 11, which rotates in the tilting direction integrally with the first tilt gear 46 and the second tilt gear 47, every 0.71°. Thus, a relatively inexpensive photo interrupter is able to detect the rotation in the panning direction with high accuracy.

At this time, as shown in FIG. 2, the timing belt 43 is used to transmit the rotation drive of the tilt motor 41 to the toothed pulley 44. Accordingly, no backlash is generated during drive transmission from the tilt motor 41 to the toothed pulley 44 and no error occurs between the rotation of the tilt motor 41 and the actual rotation of the toothed pulley 44.

In the drive transmission from the toothed pulley 44 to the first tilt gear 46 and the second tilt gear 47, the first tilt gear 46 and the second tilt gear 47, which have a helical gear shape as described above, engages the gear 68 of the toothed pulley 44 such that the gear 68 is held by a biasing force. Due to this configuration in which backlash is hardly generated, an error hardly occurs between the rotation detection by the tilting rotation detection unit 60 mounted on the toothed pulley 44 and the rotation of the lens barrel 11 in the tilting direction. The tilting rotation detection unit 60 can also be used as a means for detecting an unintended tilting rotation of the video camera 1 due to an impact and the like.

Figure 7:
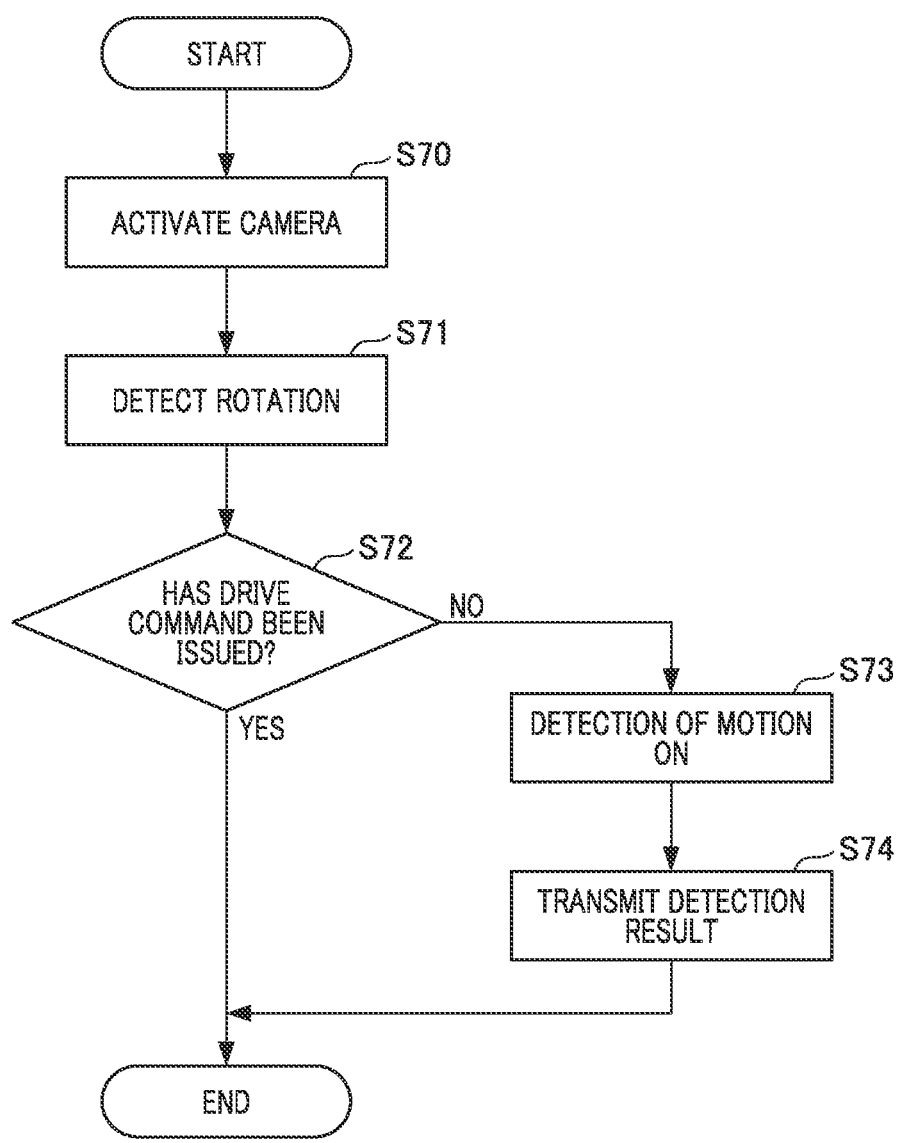
FIG. 7 is a flowchart illustrating a flow of detecting unintentional rotation operation in the image pickup apparatus in the embodiment of the present invention.

FIG. 7 is a flowchart showing a flow of detecting unintentional rotating operation in the image pickup apparatus in the present embodiment of the present invention. The flow in this flowchart is realized by a CPU (not illustrated) in the image pickup apparatus executing a computer program stored in a memory. In step S70, when the lens barrel 11 is rotated in the tilting direction in a state in which the video camera 1 or the pan/tilt head is activated, in step S71, the tilting rotation detection unit 60 always detects the rotation.

In step S72, when the lens barrel 11 is rotated in the tilting direction while a normal tilting rotation drive command (drive signal) is not issued in the video camera 1, "NO" is determined, so that it is determined that the lens barrel 11 of the camera unit has been unintentionally rotated due to an external impact, for example, an object or a person hits the camera unit. Then, the process proceeds to step S73 and, a signal for indicating "detection of motion" (a rotation detection signal), which means detection of unintentional motion, is generated (ON).

In a state in which the signal of "detection of motion" is ON, the result for detection determined to be in "detection of motion" state is transmitted to an external device connected to the video camera 1 via a network. Then, a notification about the "detection of motion" state is provided to a user by, for example, an indicator 31 mounted on the video camera 1 shown in FIG. 2 and a screen of an operation terminal connected to the video camera 1 via a network. The user notices that the lens barrel 11 has been unintentionally rotated due to this notification and the user can correct the direction of the camera to a direction of a target object.

Next, the panning rotation detection unit 70 in the video camera 1 of the present embodiment will be described. Since the panning rotation detection unit 70 has many similarities with the tilting rotation detection unit 60 described above, the description will be omitted as appropriate.

Figure 8:
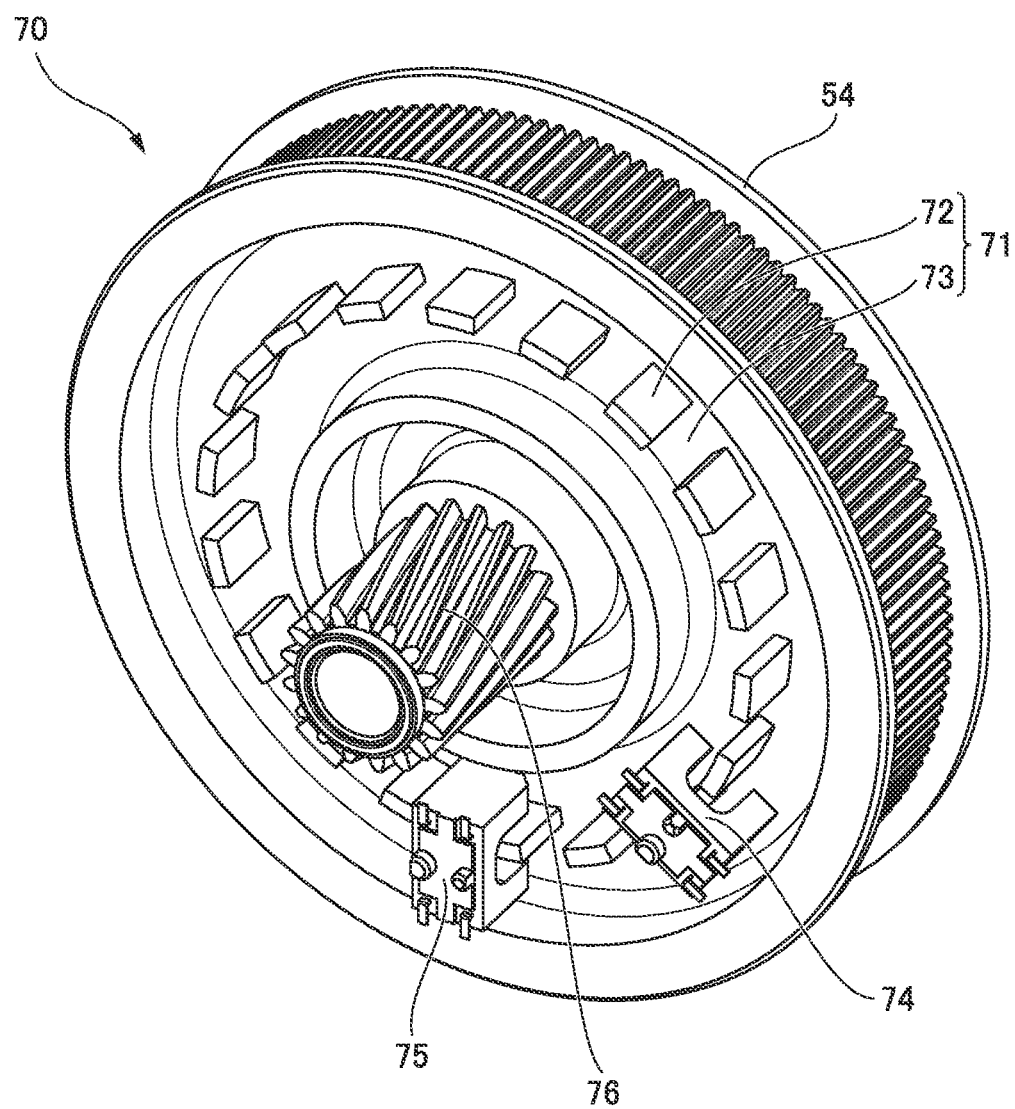
FIG. 8 is a perspective view illustrating a panning rotation detecting unit of the image pickup apparatus in the embodiment of the present invention.

FIG. 8 is a perspective view illustrating a panning rotation detection unit of the image pickup apparatus in the present embodiment. As shown in FIG. 8, the panning rotation detection unit 70 includes two photo interrupters 74 and 75. The panning rotation detection unit 70 also includes a plurality of light shielding portions 72 that is provided at every predetermined angle around rotation center of the toothed pulley 54 serving as the first deceleration mechanism and can shield light emitted from the light emitting part of the photo interrupter.

Additionally, the panning rotation detection unit 70 has a light transmitting portion (slit) 73 between the plurality of light shielding portions 72, the light shielding portion 72 and the light transmitting portion 73 configure a rotation detection ring 71. The photo interrupters 74 and 75 each have a light emitting part and a light receiving part that faces away from the light emitting part, and the light shielding portion 72 and the light transmitting portion 73 pass between the light emitting part and the light receiving part accompanying the rotation of the toothed pulley 54.

At this time, the rotation detection ring 71 rotates integrally with the rotation of the toothed pulley 54. Accordingly, when a driving force is transmitted to the toothed pulley 54 via the timing belt 53 due to the rotation drive of the panning motor 51, the rotation detection ring 71 rotates. The light shielding portion 72 and the light transmitting portion 73 formed on the rotation detection ring 71 are arranged alternately at a certain width to form a comb tooth shape. Therefore, when the rotation detection ring 71 rotates, an operation in which light emission from the photo interrupters 74 and 75 is shielded by the light shielding portion 72 and transmitted by the light transmitting portion 73 is alternately repeated.

The photo interrupters 74 and 75 are disposed separately with a predetermined rotation phase difference on the base unit 30 so that the number of rotations and angle of rotation of the rotation detection ring 71 can be detected. Additionally, the reference position that is the reference of the rotating position of the lens barrel 11 in the panning direction is detected by a photo interrupter (not illustrated) disposed on the surface of the base unit 30 facing the tilt chassis 21 and a light shielding portion (not illustrated) that can move integrally with the tilt chassis 21.

Figure 9:
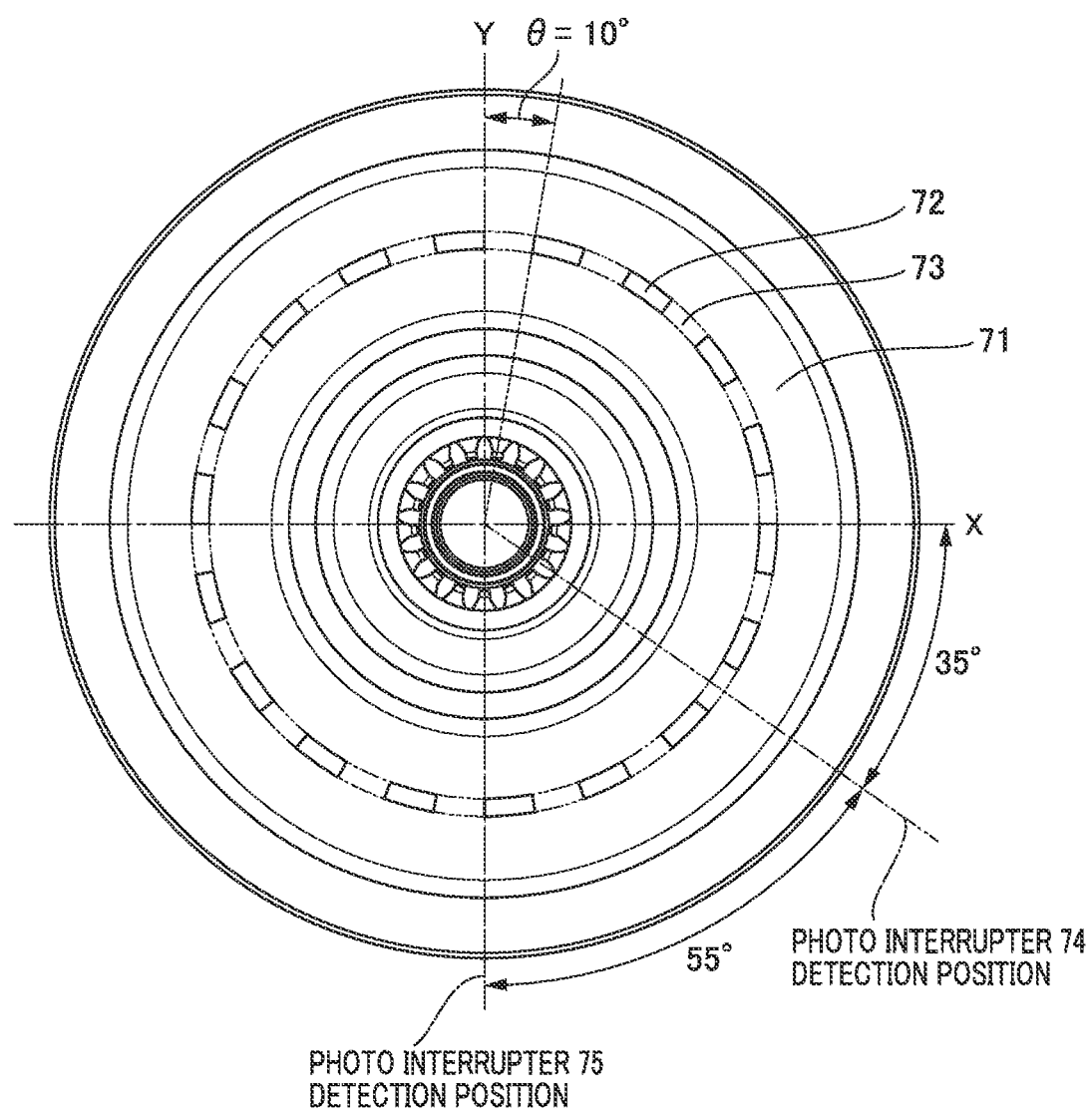
FIG. 9 is a relation between the photo interrupter and the tilting rotation detection ring of the image pickup apparatus in the embodiment of the present invention.

FIG. 9 illustrates the relation between the photo interrupter and the panning rotation detection ring of the image pickup apparatus in the present embodiment. The X-axis and Y-axis shown in FIG. 9 are shown for convenience of explanation. The X-axis matches the optical axis, and the positive direction of the X-axis is the front direction of the lens barrel 11. The width of the angle of each of the light shielding portion 72 and the light transmitting portion 73 is $\theta$. The arrangement of the photo interrupters 74 and 75 is an example and the present invention is not limited thereto.

The width $\theta$ of each of the light shielding portion 72 and the light transmitting portion 73 is $\theta=10°$, as in the tilting rotation detection unit 60. The photo interrupter 74 is disposed at a position rotated 35° from the X-axis, and the photo interrupter 75 is disposed at a position further rotated by 55° ($=5\theta+\theta/2$) from the photo interrupter 74. The rotation phase difference, which is the separation interval between photo interrupters 74 and 75, may be $(n\theta+\theta/2)°$, where "n" is an integer.

In the panning rotation detection unit 70, the presence or absence of rotation and the rotation angle are detected by a repeat of the light receiving state and light shielding state of the photo interrupters 74 and 75, as in the tilting rotation detection unit 60.

FIG. 10 illustrates the light receiving state and light shielding state of each of the photo interrupters 74 and 75 when the rotation detection ring 71 of the panning rotation detection unit 70 rotates clockwise. As shown in FIG. 10, in the panning rotation detection unit 70, when the rotation detection ring 71 rotates clockwise, the outputs of the photo interrupters 74 and 75 change from (Lo, Lo) of step S1 to (Lo, Hi), (Hi, Hi), and (Hi, Lo), as in the tilting rotation detection unit 60. In step S5, the outputs of the photo interrupters 74 and 75 return to (Lo, Lo) as in step S1, and the same change pattern are repeated thereafter.

At this time, since the angle between the photo interrupter 74 and the photo interrupter 75 differs by 55° ($=5\theta+\theta/2$) as shown in FIG. 8, the steps shift every 5° from step 1 to step 5. That is, the rotation of the toothed pulley 54 on which the rotation detection ring 71 is mounted can be detected every 5°.

At this time, in the panning rotation drive mechanism 50 of the video camera 1 of the present embodiment, a deceleration ratio from the toothed pulley 54 to the first panning gear 56 and the second panning gear 57 is seven times. Hence, it is possible to detect the rotation of the lens barrel 11 that rotates in the panning direction integrally with the first panning gear 56 and the second panning gear 57, every 0.71°. Thus, a relatively inexpensive photo interrupter is allowed to detect the rotation in the panning direction with high accuracy.

At this time, as shown in FIG. 3, the timing belt 53 is used to transmit the rotation driving of the panning motor 51 to the toothed pulley 54. Accordingly, no backlash is generated during driving transmission from the panning motor 51 to the toothed pulley 54 and no error occurs between the rotation of the panning motor 51 and the actual rotation of the toothed pulley 54.

Additionally, in the drive transmission from the toothed pulley 54 to the first panning gear 56 and the second panning gear 57, the helical gear 76 of the toothed pulley 54 is engaged with the first panning gear 56 and the second panning gear 57 formed in the helical gear shape described above such that the helical gear 76 is held by a biasing force. Due to the configuration in which backlash is hardly generated, an error hardly occurs between the rotation detection performed by the panning rotation detection unit 70 mounted on the toothed pulley 54 and the rotation of the lens barrel 11 in the panning direction.

Additionally, in the panning rotation detection unit 70, if the panning rotation is unintentionally performed as in the tilting rotation detection unit 60, the unintended rotation can be detected and displayed by using the same flow shown in FIG. 7.

As described above, in the present embodiment, the rotation drive unit includes the panning rotation drive unit and the tilting rotation drive unit, and the panning rotation drive unit and the tilting rotation drive unit each have a similar configuration. That is, since the panning rotation drive unit and the tilting rotation drive unit respectively have the drive source (the drive unit), the first deceleration mechanism, the second deceleration mechanism, and the rotation angle detection means, it is possible to detect the panning rotation and the tilting rotation with the equivalent accuracy.

In the present embodiment, the tilting rotation detection unit 60 and the panning rotation detection unit 70 respectively include one rotation detection ring 61 and one rotation detecting ring 71 to be capable of performing rotation detection with low cost and high accuracy. The rotation detection ring 61 and the rotation detection ring 71 are respectively disposed on the toothed pulley 41 and the toothed pulley 54, and thereby the tilting rotation and the panning rotation with the equivalent accuracy can be detected.

In the image pickup apparatus in the present embodiment, although the width θ of each of the light shielding portion 62 and the light transmitting portion 63 (each of the light shielding portion 72 and the light transmitting portion 73) is set to 10°, the width θ is not limited thereto, and may be determined by resolution necessary for detecting the rotation in the tilting direction (panning direction). In the present embodiment, the base unit 30 and the rotation unit 20 configuring a pan/tilt head for rotating the camera unit in the panning and tilting direction are coupled to the camera unit. However, as described above, it may be possible to adopt a configuration in which the camera unit can be easily attached to and detached from the pan/tilt head, and a configuration in which a different camera unit can be mounted to the pan/tilt head.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the pan/tilt head or the image pickup apparatus through a network or various storage media. Then, a computer (or a CPU, an MPU, or the like) of the pan/tilt head or the image pickup apparatus may be configured to read and execute the program. In such a case, the program and the storage medium storing the program configure the present invention.

This application claims the benefit of Japanese Patent Application No. 2020-188714 filed on Nov. 12, 2020, which is hereby incorporated by reference herein in its entirety.

What is claimed is:

1. A pan/tilt head comprising:
a drive unit configured to rotate a camera unit in a predetermined direction;
a first deceleration mechanism configured to be rotatable and engage the drive unit via a drive transmission unit;
a second deceleration mechanism configured to be rotatable and engage the first deceleration mechanism; and
a rotation angle detector configured to be disposed on the first deceleration mechanism and detect a rotation angle of the first deceleration mechanism.

2. The pan/tilt head according to claim 1,
wherein the rotation angle detector comprises a plurality of photo interrupters each including a light emitting part and a light receiving part and a plurality of light shielding portions provided at predetermined angles around the rotation center of the first deceleration mechanism and can shield light emitted by the light emitting part of the photo interrupter, and
wherein the photo interrupters are separately arranged with a predetermined rotation phase difference and detect the rotation angle by a combination of a light receiving state and a light shielding state of each of the photo interrupters.

3. The pan/tilt head according to claim 2,
wherein the rotation phase difference is $(n\theta+\theta/2)°$, where "n" is an integer.

4. The pan/tilt head according to claim 1,
wherein if the rotation angle detector detects that the camera unit has rotated in the predetermined direction in a state in which a drive signal for rotating the camera unit in the predetermined direction is not output, a rotation detection signal is output.

5. The pan/tilt head according to claim 1,
wherein the drive transmission unit that transmits a drive force from the drive unit to the first deceleration mechanism includes a timing belt.

6. The pan/tilt head according to claim 1,
wherein the first deceleration mechanism includes a helical gear,
wherein the second deceleration mechanism includes a first helical gear and a second helical gear that are engaged together with the helical gear of the first deceleration mechanism, and
wherein a biasing unit configured to relatively bias the first helical gear and the second helical gear along a rotation axis direction of the helical gear of the first deceleration mechanism is provided.

7. The pan/tilt head according to claim 1,
wherein the predetermined direction includes at least one of a panning direction and a tilting direction.

8. The pan/tilt head according to claim 1 further having a panning rotation drive unit and a tilting rotation drive unit,
wherein the panning rotation drive unit and the tilting rotation drive unit each have the drive unit, the first deceleration mechanism, the second deceleration mechanism, and the rotation angle detector.

9. An image pickup apparatus comprising:
a pan/tilt head having a drive unit configured to rotate a camera unit in a predetermined direction, a first deceleration mechanism configured to be rotatable and engage the drive unit via a drive transmission mechanism, a second deceleration mechanism configured to be rotatable and engage the first deceleration mechanism, and a rotation angle detector configured to be disposed on the first deceleration mechanism and detect a rotation angle of the first deceleration mechanism; and
the camera unit that can be mounted on the pan/tilt head.

* * * * *